3,436,309
MODIFYING STARCHES
August F. Ottinger and Paul R. Graham, St. Louis, Mo., assignors to Monsanto Company, St. Louis, Mo., a corporation of Delaware
No Drawing. Filed Feb. 4, 1966, Ser. No. 538,526
Int. Cl. C08b 25/02; C12c; C12k 1/10
U.S. Cl. 195—31                                    9 Claims

ABSTRACT OF THE DISCLOSURE

Compositions comprising (a) an alpha-olefin-maleic copolymer and (b) certain amylase/protease enzymes which are useful in the preparation of resin-modified converted starch sizing compositions.

---

This invention relates to starch conversion processes and to synthetic resin modified starch compositions. More particularly, this invention provides a simple one-step method for converting raw starch and for combining converted starch with a basic synthetic resin so that the resulting composition can be used in the sizing of cellulose webs, such as paper board and in paper coating compositions to increase resistance of the coated paper to the pull or "pick" of tacky printing inks in printing processes.

Raw starch is presently commercially converted with amylase enzymes which function at the gelatination temperature of starch (78°–80° C.) at a pH range of 6.5–7.5. The enzymatic action, being limited to these narrow pH parameters, is retarded or stopped when the pH falls below or exceeds these values. Therefore, it is usual procedure to enzyme convert raw starch as a separate operation and then thereafter, add any starch modified such as a synthetic copolymer resin, e.g., to decrease the water sensitivity of the starch.

The trend in paper surface sizing and paper coating operations is to use compositions having a basic pH as the paper sizing or paper coating adhesive agent so that these materials will be compatible with the use of inexpensive basic pigments such as calcium carbonate, kaolin clays, etc.

An example of a basic synthetic resin that is often used to modify the properties of converted starch is an alpha-olefin-maleic anhydride resin which may be of high or low molecular weight, say, those having molecular weights of from about 2000 to about 200,000 or more. To be soluble in aqueous solutions these resins, which are often sold in the anhydride form, must be treated with a base such as ammonia, ammonium hydroxide, sodium hydroxide, potassium hydroxide, etc., to convert the anhydride moieties of the polymer to the salt form. A recent development is to combine the starch with a low molecular weight styrene/maleic copolymer (mol. wt. 2,000–9,800) which is converted essentially to the half-amide, half-ammonium salt. All of these resins in water soluble form are thus basic in nature. As a result, it was not feasible, prior to this invention, to blend the raw starch with the basic resin prior to converting the starch with the enzyme because the enzyme would not convert the starch "efficiently" in a strongly basic pH medium say, at pH 8 to 10, which is desirable to maintain solubilization of the synthetic resin. It is desirable, therefore, to provide the enzyme converted starch art with new compositions and methods which will simplify the procedures necessary and to broaden the conditions of operations useable for obtaining useful enzyme-converted starch compositions.

It is an object of this invention to provide a basic synthetic resin-enzyme composition which may be mixed with raw starch before the cooking thereof to obtain in one operation a resin modified converted starch composition.

A further object of this invention is to provide a method for converting raw starch in basic pH conditions in the presence of synthetic resin compositions.

Other objects, aspects, and advantages of the invention will become apparent from reading the following description of the invention and the appended claims.

Briefly, this invention contemplates a dry solid composition which comprises (a) a basic, water soluble alpha-olefin-maleic copolymer resin, and (b) an amylase/protease enzyme, which is obtained by growing a mutated *Bacillus subtilis* organism (isolated as described in U.S. Patent 3,031,380) on a fermentation medium of corn meal, wheat bran, and rice bran in water, and the use of this composition in the enzyme-conversion of starch by mixing a minor amount of such composition in water with a major amount of raw starch and then cooking the resulting starch composition in a basic pH range of at least about 8 to convert the starch with the enzyme and to maintain solubility of the resin in the aqueous medium and then killing the enzyme activity by heating the mixture to a suitable temperature in the conventional manner. The resulting resin modified converted starch composition may be used in any application where resin modified converted starches are conventionally used. A particular application of interest to us is the use of such compositions as surface sizes for cellulose webs and as a component in pigment coating color compositions for coating papers to make fine quality, pick-resistant, such as bond, ledger, offset, bristol and envelope, papers. They are also useful for making tacky adhesives useful in laminating cellulose materials, e.g., in the making of paper board.

Alternatively, the starch, alpha-olefin-maleic copolymer type of resin, and the amylase/protease enzyme may be added separately to a mixing vessel containing water and then the mixture may be cooked to enzyme conversion temperature as above, and then the mixture may be heated to a higher temperature to kill the enzyme activity.

The starch used in making the resin modified enzyme-converted starches of this invention may be ordinary kinds of starch commonly used in making starch coatings and starch adhesives, including tapioca starch, corn starch, potato starch, sago starch, wheat starch, etc.

The enzymes used in converting the starch in the manner of this invention are amylase-containing enzymes which are active for starch converting purposes at conventional starch cook temperatures, say, 75°–85° C. in a substantially basic pH medium, say, pH 8–10, in the basic reacting synthetic resins. We have found that amylase/protease enzymes suitable for this purpose are obtained from fermentation broths resulting from the growing of a mutated *Bacillus subtilis* organism (isolated as described in U.S. Patent 3,031,380) in an aerated, agitated, submerged fermentation method using corn meal, wheat bran, and rice bran in water as the medium. The fermentation medium may also contain minor amounts of suitable inorganic salts such as zinc salts, such as zinc chloride, or ammonium nitrate to increase the yield of enzyme, and to shorten the average time of fermentation, as well as a calcium salt such as calcium acetate which appears to stabilize the amylase and protease enzymes produced and antifoaming agents, such as 1 percent 1-octadecanol and a 20 v./v.% suspension of "Dow Corning Antifoam B" in water. A medium containing about 0.75 g. of ammonium nitrate per liter of fermentation liquor, and about a 0.1 percent solution of calcium acetate in the fermentation liquor appear to be about optimum for maximum production of amylase/protease enzyme although the quantities of each may vary considerably therefrom. For example, amylase/protease enzyme has been produced from fermentation liquors containing test amounts of ammonium nitrate ranging from 0.5 to 1.25 g. per liter of water.

The optimum fermentation times and recovery of enzyme procedures are not the subject of this invention. However, it is believed that about 36 hours of fermentation and then recovery of the enzyme from the fermentation broth by the use of organic solvents to precipitate the enzymes. Acetone and methanol are the best procedures. Acetone and methanol are suitable organic solvents for this purpose with from about 1.5 to 4 volumes of the solvent per volume of fermentation broth being necessary to completely precipitate the enzymes. The final amylase/protease enzyme product is a brown flaky material containing all the insoluble material in the original fermentation liquor as well as the protease and amylase which had been recovered. It contains under 10 percent moisture and is stable indefinitely if kept in dry form. These amylase/protease enzymes may also be obtained from semisolid (tray fermentation) media, e.g., wherein the mutated Bacillus subtilis is grown in a medium such as 20 parts of a mixture corn meal, wheat bran, and rice bran present in a weight ratio of 7:9:4 respectively, in 30 parts of water, containing a small amount of calcium acetate to stabilize the enzyme produced.

These enzymes may be added as such to water mixtures of starch and the synthetic resins to effect conversion of the starch. However, these enzymes are most conveniently used by mixing them in solid form with the dry solid alpha-olefin-maleic copolymer and packaged for use of the mixture as a single product to be added to the same water to which the starch is added for conversion.

The basic reacting synthetic resins which are used in this invention are copolymers of at least one alpha-olefin and at least one alpha,beta-olefinically unsaturated polycarboxylic acid or anhydride thereof. It is preferred that the aypha-olefin be a hydrocarbon having from 2 to about 40 carbonations or an alkyl vinyl ether, and that the alpha, beta-olefinically unsaturated polycarboxylic acid or anhydride used be maleic anhydride. Such copolymers are generally prepared by polymerizing the alpha-olefin and maleic anhydride or other equivalent material, and recovered as a dry product. The anhydride form of the polymer is usually water insoluble as such, but may be packaged with the enzyme as such or first be converted to a water soluble form, and recovered in dry form as the salt or amide-salt by treatment with a base such as caustic soda, ammonia or ammonium hydroxide, and then combined with the enzyme. However, if desired, the synthetic resin may be mixed in aqueous solution form with the water-starch-enzyme mixture.

The alpha-olefin-maleic anhydride copolymer utilized as a component usually contains essentially equimolar proportions of the alpha-olefin and maleic anhydride units. However, copolymers in which the molar ratio of maleic anhydride to alpha-olefin is from about 0.90:1 to about 1.8:1 can be utilized. Copolymers having about equimolar amounts of maleic anhydride are preferred. Any available copolymers can be used, but copolymers containing very much less than about 0.9 moles of maleic anhydride per mole of alpha-olefin result in products that are, at best, only difficulty soluble or dispersible in water. The best sizes are made from copolymers having substantially alternating maleic anhydride-olefin moieties. The copolymers are prepared in conventional manners with or without solvents such as benzene or xylene, and using catalysts such as azobis(isobutyronitrile), di-t-butyl peroxide, t-butyl perbenzoate, benzoyl peroxide, and any initiator which will be effective at from about 50–150° C. such as isopropyl peroxydicarbonate, tetrachlorobenzoyl peroxide and the like. The polymers employed in accordance with this invention have molecular weights of at least about 2,000, and may range up to the general neighborhood of about 200,000. Molecules of excessive size introduce operational difficulties such as a rapidly increasing tendency to gel, reduced ease of application, and the like; whereas, polymers having a molecular weight substantially under 2,000 provide less satisfactory starch modifiers.

The term "alpha-olefin" and "olefin" are used herein as general terms to designate olefinically unsaturated compounds in which the double bond is in the alpha-position, and is intended to include not only olefinically unsaturated branched and straight chained hydrocarbons such as the aliphatic olefins, e.g., ethylene, propylene, 1-butylene, isobutylene, 1-pentylene, 1-hexene, 1-octene, 1-nonene, 1-decene, 1-dodecene, 1-tridecene, 1-tetradecene, 1-pentadecene, 1-hexadecene, 1-octadecene, 1-eicosene, 1-docosene, 1-tetracosene, 1-pentacosene, etc. and the aromatic alpha-olefin hydrocarbons such as styrene, alkyl-substituted styrenes such as vinyl toluene, the vinyl xylenes, vinyl 4-ethylbenzene, the chlorosubstituted styrenes, etc., but is also intended to include other alpha-olefinically unsaturated polymerizable compounds such as alkyl vinyl ethers having about 8 or more carbon atoms in the alkyl groups, the corresponding alkenyl vinyl ethers having at least about 8 carbon atoms in the alkenyl group where sizing action is being sought. Mixtures of the alpha-olefins may be used to react with the maleic anhydride to make the copolymer materials used for this invention, e.g., mixtures of alkyl vinyl ethers and vinyl toluene may be reacted with maleic anhydride to prepare useful copolymers. Thus the term "copolymer" as used herein includes the use of interpolymers of more than two monomer materials.

The alpha-olefins used in preparing the copolymers can vary considerably in molecular weight and can contain an average of from 2 to about 40 carbon atoms. The hydrocarbon alpha-olefins can be obtained from naturally occurring compounds or by the polymerization or cracking of petroleum fractions and the like. In commercial practice, they are generally mixtures containing compounds of varying length. Therefore, the number of carbon atoms attributed to such mixtures represents a weighted average rather than an absolute value.

Vinyl ethers, which may be used in preparing the copolymers used as starch modifiers may be prepared in conventional manner by treating an alcohol with an alkali catalyst followed by reaction with acetylene. The alcohols used can be straight or branched chained, obtained from natural products or be synthetically made, e.g., those alcohols resulting from the "oxo" and other processes. The vinyl ethers have the general formula $$Z\text{---}O\text{---}CH=CH_2$$

wherein Z is alkyl, alkenyl, aryl, alkoxyalkyl, aryloxyalkyl, alkylaryl and the like containing from 2 to about 40 carbon atoms and preferably from about 8 to about 32 carbon atoms if hard sizing is desired. Representative vinyl ethers include, e.g., the alkyl vinyl ethers such as the oxo-decyl, oxo-tridecyl, oxo-hexadecyl, oxo-nonadecyl, propyl, hexyl, n-decyl, n-dodecyl, n-octadecyl, n-tetracosyl, n-tritriacontyl, tetratricontyl, n-hexatriacontyl vinyl ethers, the corresponding alkenyl vinyl ethers, a few examples of which are dodecenyl vinyl ether, heptadecenyl vinyl ether and octadecenyl vinyl ether, as well as the aryl, aralkyl, and alkaryl, alkoxyaryl, aryloxyaryl, aryloxyalkyl vinyl ethers, e.g., phenyl, benzyl, tolyl, xylyl, dodecylphenyl, octadecylphenyl, dinonylphenyl, methoxyphenyl, ethoxyphenyl, dodecyloxyphenyl, octadecyloxyphenyl, phenoxyhexyl, phenoxyoctyl, phenoxyoctadecyl vinyl ethers, and the like.

For reasons of availability and favorable cost maleic anhydride is preferred as the alpha-beta-unsaturated polybasic carboxylic acid anhydride comonomer in preparing the copolymers which are used in this. However, other such unsaturated polybasic acid anhydrides which could readily be used to prepare the copolymers and which are included as being useful in this invention are anhydrides such as itaconic acid anhydride, citraconic acid anhydride, and other copolymerizable related homologous unsaturated polybasic carboxylic acid anhydrides.

In making the resin modified enzyme converted starch compositions of this invention, there is prepared a mixture of water and a raw starch, resin, and the enzyme containing from 5 to about 50% of starch by weight, from 1 to 20 percent of the resin based on the weight of the dry starch and from about 0.001 to about 3 percent based on the weight of the starch, of the amylase/protease enzyme, depending upon the type of starch used, the percent solids, and the desired viscosity of the water-starch-resin-enzyme mixture product. For most paper treatment applications, water-starch-resin-enzyme compositions containing from about 5 to 15 percent by weight of starch, with the resin and enzyme quantities being based on the weight of the starch as above, are most suitable. Higher starch solid compositions may be used to make more viscous adhesives.

The water mixtures so obtained are then heated to enzyme conversion temperature which is generally just above the gelatinization temperature of the starch and is held at this temperature to permit the enzyme to act upon the starch for a sufficient period of time which will be dependent upon the viscosity desired in the cooked starch. In general, the longer the mixture is held at this temperature and the longer action of the enzyme continues, the thinner and less viscous the converted starch composition will be. In general, time periods of up to about 30 minutes at an optimum temperature of 78°–80° C. is usually sufficient for most purposes. For paper treatment applications, the enzyme conversion of the starch is usually carried to a point such that the viscosity of the composition is in the range of from about 50 to 300 cp. at 50° C.

When the viscosity of the mixture has reached the desired point the temperature of the mixture is increased sufficiently to kill or at least inhibit further enzyme activity; such temperature may usually be about 95° C. The starch composition is then cooled to the desired temperature (usually to 50° C. to 60° C.) for application to paper webs. In addition to the use of these compositions as paper coating agents, they may be combined with additional raw starch, say, from 1 to 50% of the original starch, and then heated to above the gelatinization point to make a uniformly gelatinized product of increased viscosity which is as an adhesive for miscellaneous pasting operations.

The invention is further illustrated by the following detailed examples.

EXAMPLE 1

Raw unconverted tapioca starch (also called cassava starch) compositions were first prepared by slurrying a dry mixture of (1) an amylase/protease enzyme with (2) a commercially available high molecular weight styrene/maleic copolymer, disodium salt in water, and then adding the tapioca starch to the aqueous slurry. The proportions of the ingredients used are given in the table below. The aqueous enzyme-copolymer-starch mixtures were cooked for 10 minutes at about 80° C. to convert the starch with the enzyme in the presence of the copolymer. The temperature of the mixtures was then raised to 97° C. for 10 minutes to kill the enzyme action.

The formulations prepared were as follows:

age molecular weight of some 60,000 to 70,000 and which is converted to the disodium salt form, which is sold in a dry form, and which is water soluble. The prercent of this resin used is based on the weight of the starch. The percent of the enzyme used is also based on the weight of the raw unconverted starch. It may be packaged with the resin material, however, and added to the starch in such a composition.

The amylase/protease enzyme used in this invention is one that is active under basic pH conditions (pH 8–10) so that it can be used to effect starch conversion in the presence of desired basic polymeric resin starch modifiers. This enzyme was prepared by a submerged fermentation technique which involved growing a mutated *Bacillus subtilis* organism (isolated as described in U.S. Patent 3,031,380, issued Apr. 24, 1962) on a fermentation medium of corn meal, wheat bran, and rice bran in a 7:9:4 weight ratio. A typical formulation was as follows:

| | | |
|---|---|---|
| Corn meal | g | 56 |
| Wheat bran | g | 72 |
| Rice bran | g | 32 |
| $NH_4NO_3$ | g | 0.75 |
| Calcium acetate | g | 1.0 |
| Tap water | ml | 1000 |

This fermentation medium slurry or broth was autoclaved at 15 lbs. steam pressure for 20 to 30 minutes, and inoculated at the level of 0.1 ml. of the mutated *Bacillus subtilis* cell suspension (growth from slant in 4 ml. of steril water) per 100 ml. of fermentation broth, and incubated at about 38° C.±2° C. over a 36-hour fermentation period. The enzyme containing fermentation broth was treated with acetone while stirring to precipitate the crude enzyme product (1 to 1.25 volumes of acetone/volume of fermentation liquor). After filtering and washing the enzyme containing filter cake with acetone, it is dried at room temperature for 14 to 16 hours. The resulting amylase/protease product can be stored indefinitely if kept dry. A purified sample used in this work contained approximately 248,000 units/gram of amylase and about 1,190,000 units/g. of protease.

EXAMPLE 2

To an aqueous mixture of water and 1 part of a styrene-maleic anhydride copolymer (mol. wt. 8,000–9,800) converted essentially to the half-amide half-amonium salt, there was added 10 parts of a raw tapioca starch, and 0.0003 part of either (a) a commercially available amylase enzyme recommended for starch conversion and used to convert raw starch at the gelatination temperature of starch (78°–80° C.) at a pH of 6.5–7.5, or (b) the amylase/protease enzyme produced as described in Exxample 1, while mixing thoroughly. Each resulting mixture containing enzymes (a) and (b) was heated rapidly to 80° C. and held at that temperature for 10 minutes to convert the starch, and then heated rapidly to 95° C. and held at that temperature for 10 minutes to kill the enzyme activity.

The amylase enzyme (a) composition behaved like raw starch without enzyme during the cooking or converting phase. It progressed as usual through the gelatination

| Ingredient | Composition, percent by weight | | | | |
|---|---|---|---|---|---|
| | 1 | 2 | 3 | 4 | 5 |
| Tapioca starch | 8.0 | 8.0 | 8.0 | 8.0 | 8.0 |
| S/MA-Na salt | 10.0 | 10.0 | 10.0 | 10.0 | 10.0 |
| Enzyme | 0 | 0.1 | 0.01 | 0.005 | 0.001 |
| Total solids | 8.8 | 8.84 | 8.804 | 8.802 | 8.801 |
| pH | 8.5 | 8.6 | 8.6 | 8.5 | 8.3 |
| Visc. at 50° C., cps | (¹) | 11.0 | 85.3 | 85.3 | 913.0 |
| Conversion gel at 75° C | Positive | None | None | Slight | (²) |

¹ Extremely thick gel.
² Slight but gradual.

The syrene-maleic-disodium salt is a copolymer resin of styrene/maleic anhydride copolymer having an averphase, gradually becoming somewhat thinner but at no time did it reach a fluid state but remained on the verge of a weak gel. When exposed to the enzyme killing temperature of 95° C. the mix gradually became an extremely thick but thixotropic gel having a pH of 8.2. It appeared as though the pH of the mixture made the enzyme inactive.

The amylase/protease enzyme (b) composition passed through the usual gelatination phase during the cooking phase, and then thinned down to a fixed viscosity which did not change during the 95° C. enzyme kill phase, which indicated that the starch was converted even in the basic pH medium.

EXAMPLE 3

Various starch/styrene-maleic copolymer resin compositions were compounded as set forth in the following table:

| Ingredient | I | | II | | III | |
|---|---|---|---|---|---|---|
| | Percent Solids | Gms. | Percent Solids | Gms. | Percent Solids | Gms. |
| Hydroxyethylated corn starch | 8 | 40.0 | | | | |
| Tapioca starch | | | 8.0 | 40.0 | 8.0 | 40.0 |
| S/MA-diNa salt | 0.8 | 4.0 | 0.8 | 4.0 | | |
| S/MA-amide-NH₄ salt | | | | | 2.71 | 13.55 |
| Amylase/protease enzyme | | | 0.00024 | 0.0012 | 0.00024 | 0.0012 |
| H₂O | 91.2 | 456.0 | 91.20 | 456.00 | 89.29 | 446.45 |

In each case, the ingredients were slurred together, heated rapidly to 80° C. and held at that temperature for 10 minutes, heated rapidly to 95° C. and held at that temperature for 10 minutes, and then cooled to 50° C. The compositions had the following viscosities (at 50° C.) and pH:

| Composition | Viscosity, cp./at 50° C. | pH |
|---|---|---|
| I | 276 | 8.58 |
| II | 120 | 8.78 |
| III | 206 | 8.25 |

Samples of 50 lb. basis weight water leaf paper were surface treated on a size press with one of the compositions I, II, and III, above, using 25 lbs. of pressure and then tested for sizing effectiveness as measured by ink penetration and penetration of 20% lactic acid in water solution by standard TAPPI test procedures. In addition, a measure of the ability of the respective papers to withstand "pick" was determined by a wax pick test and an I.G.T. printing pick resistance test. The results are given in the following table:

| Test | Paper | | | |
|---|---|---|---|---|
| | Control | I | II | III |
| Ink penetration,[1] sec. | 95 | 128 | 128 | 214 |
| 20% lactic acid,[2] sec. | 165 | 973 | 990 | 858 |
| Tensile strength, M.D.[3] | 15.5 | 20.2 | 21.4 | 20.9 |
| Wax pick, wax No.[4] | 12 | 16 | 16 | 18 |
| I.G.T. pick test:[5] | | | | |
| No. 3 ink | 315 | 630 | 630 | 630 |
| No. 6 ink | | | 140 | 630 |

[1] Ink Penetration Test—TAPPI No. RC-14.
[2] 20% Lactic Acid Drop Test—TAPPI No. RC-18.
[3] M.D. is machine direction.
[4] Wax No. is the number of the highest melting Dennison wax which can be pulled from the paper sheet without pulling fibers from the paper
[5] I.G.T. pick test is one in which a tack graded ink is applied uniformly to a standard diameter wheel. A strip of paper or paper board containing the test coating thereon is fastened to a spring loaded cylindrical segment of known diameter. The ink laden wheel is placed against one end of the strip of paper or paper board at a known constant pressure. The cylinder spring is released and as the cylinder passes through a given arc, the tacky ink is applied to the strip at a velocity increasing from 0 to about 630 ft. per second. If the coating fails ("picks") a break in the coating will be apparent at some point on the strip. The first point of consistent failure is measured and reported as the velocity (ft./sec.) and ink tack number withstood by the coating before failure. The higher the number of the ink, the higher is the tack of the ink.

These data show that starch can be converted with enzymes in the presence of styrene/maleic resins without loss of sizing properties obtainable from preconverted starches (hydroxyethylated) mixed with the styrene/maleic copolymer.

The enzyme conversion of the raw starch in the presence of the styrene/maleic resins is made possible through the use of an enzyme that is active, not hindered, by high pH (8.0–10.0). Enzymes normally used in converting raw starches are active only in a limited pH range (6.0–7.9) and become inactive (or hindered) when pH exceeds 7.5. Styrene-maleic copolymers, resins, regardless of type, all require a high pH for solution.

EXAMPLE 4

To a stirred aqueous solution containing 99 parts of water and 1 part by weight of the half-amide, half-ammonium salt of a copolymer of tridecylvinyl ether-maleic anhydride copolymer having a molecular weight of about 100,000 and a pH of about 8.5, there is added 10 parts of a raw corn starch, and about 0.05 part of an amylase/protease enzyme product produced as described in Example 1. The mixture is heated rapidly to 78°–80° C. and held at that temperature for about 15–20 minutes. After that time the temperature of the mixture is raised to about 95°–97° C. to inhibit further activity of the enzyme on the starch. The product obtained has a pH between 8.0 and 8.5 and is suitable for use on a size press of a paper making machine to size paper.

What is claimed is:
1. A method which comprises mixing starch and water in concentrations of from 5 percent to about 50 percent by weight of starch, based on the starch water mixture, with (a) a water soluble alpha-olefin-maleic copolymer, wherein the ratio of maleic to olefin is from about 0.9:1 to about 1.8:1 and the molecular weight is from about 2,000 to about 200,000, and (b) an amylase/protease enzyme obtained from fermentation media resulting from growing Bacillus subtilis mutant whose cells have hairless, rough, jagged, spotted, and dull white characteristics and which had been prepared by subjecting Bacillus subtilis to X-rays of an intensity corresponding substantially to 24–50 roentgens for an interval of at least half an hour, in a pH medium of from 8 to 10, heating said mixture above the gelatinization temperature of the starch but below the temperature at which the enzyme is destroyed, said heating being continued until the viscosity of the mixture is reduced to the extent desired, and then heating said mixture at a temperature sufficiently high to destroy the enzyme.

2. A method as described in claim 1 wherein the starch constitutes from 5 to 20 weight percent of the water-starch mixture, and the alpha-olefin-maleic copolymer is used in amounts ranging from about 1 to 20 weight percent, based on the weight of the dry starch, and the amylase/protease enzyme constitutes from about 0.001 to about 3 weight percent, based on the weight of the dry starch.

3. A method as described in claim 2 wherein alpha-olefin-maleic copolymer used is a copolymer of a hydrocarbon alpha-olefin having from 2 to 40 carbon atoms, and maleic anhydride, which is converted to a water soluble alkali metal salt form.

4. A method as described in claim 3 wherein the hydrocarbon alpha-olefin-maleic anhydride copolymer used is one of styrene and maleic anhydride having a molecular weight of from about 50,000 to 100,000, and is converted to the water soluble sodium salt form.

5. A method as described in claim 3 wherein the hydrocarbon alpha-olefin-maleic anhydride copolymer is a styrene-maleic anhydride copolymer having a molecular weight of from about 8,000 to 9,800, and is converted to a water soluble half-amide, half-ammonium salt form.

6. A composition comprising a dry solid mixture of (a) an alpha-olefin-maleic copolymer, wherein the ratio of maleic to olefin is from about 0.9:1 to about 1.8:1 and the molecular weight is from about 2,000 to about 200,000, and (b) an amylase/protease enzyme obtained from fermentation media resulting from growing *Bacillus subtilis* mutant whose cells have hairless, rough, jagged, spotted, and dull white characteristics and which had been prepared by subjecting *Bacillus subtilis* to X-rays of an intensity corresponding substantially to 24–50 roentgens for an interval of at least half an hour.

7. A composition as described in claim 6 wherein the alpha-olefin-maleic copolymer (a) is a copolymer of a hydrocarbon alpha-olefin having from 2 to 40 carbon atoms, and maleic anhydride, said copolymer having a molecular weight of from about 2,000 to about 200,000, said copolymer being present in said dry solid composition as the dry water soluble alkali metal salt form.

8. A composition as described in claim 7 wherein the hydrocarbon alpha-olefin-maleic anhydride copolymer is a copolymer of styrene and maleic anhydride having a molecular weight of from about 50,000 to about 100,000 and is present in the composition in the water soluble sodium salt form.

9. A composition as described in claim 7 wherein the hydrocarbon alpha-olefin-maleic copolymer is a copolymer of styrene and maleic anhydride having a molecular weight of from about 2,000 to about 9,800, and is present in said composition essentially as a dry water soluble half-amide, half-ammonium salt form.

References Cited
UNITED STATES PATENTS

| | | | |
|---|---|---|---|
| 3,251,748 | 5/1966 | High et al. | 195—31 |
| 3,272,717 | 9/1966 | Funkumoto et al. | 195—68 |

ALVIN E. TANENHOLTZ, *Primary Examiner.*

U.S. Cl. X.R.

106—210; 195—63